(12) United States Patent
Kuznetsov

(10) Patent No.: US 6,473,234 B2
(45) Date of Patent: Oct. 29, 2002

(54) TUNABLE FILTER SYSTEM WITH BACKREFLECTION REFERENCE

(75) Inventor: Mark E. Kuznetsov, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 31 days.

(21) Appl. No.: 09/796,146

(22) Filed: Feb. 28, 2001

(65) Prior Publication Data

US 2002/0118459 A1 Aug. 29, 2002

(51) Int. Cl.[7] .............................. G02B 5/28; H04J 14/02
(52) U.S. Cl. ..................... 359/578; 359/124; 359/161
(58) Field of Search .............................. 359/578, 579, 359/124, 125, 127, 161

(56) References Cited

U.S. PATENT DOCUMENTS 6,034,799 A * 3/2000 Hansen ....................... 359/124
6,341,039 B1 * 1/2002 Flanders et al. ............. 359/578

* cited by examiner

Primary Examiner—Jon Henry
(74) Attorney, Agent, or Firm—Grant Houston

(57) ABSTRACT

A tunable filter system comprises a signal source providing a WDM having multiple channels, or other signal requiring spectral analysis, within a spectral signal band. A reference signal source is also provided that generates a reference signal with spectral features, such as narrow spectral lines, that are located within a spectral reference band. A tunable filter functions as a band pass filter in transmission and a notch filter in reflection. It is controlled to filter both the reference signal and the WDM signal. A transmission detector is provided to detect the signal transmission through the tunable filter and a return detector is provided to detect the signal that is returned from the filter. Embodiments of the invention rely on a characteristic of a class of tunable filters, such as Fabry Perot etalons, in which light that is not transmitted through the filter is reflected. Thus, while the tunable filter appears as a band pass filter in transmission, it functions as a notch filter in reflection.

16 Claims, 10 Drawing Sheets

TUNABLE FILTER SYSTEM WITH BACKREFLECTION REFERENCE

BACKGROUND OF THE INVENTION

Wavelength division multiplexing (WDM) systems typically comprise multiple separately modulated laser diodes at the transmitter. Each diode generates the signal associated with one of the channels in the WDM signal. These laser diodes are tuned to operate at different wavelengths. When combined in an optical fiber, the WDM optical signal comprises a corresponding number of spectrally separated channels within a signal band. At the receiving end, the channels are usually separated from each other using thin film filter systems, to thereby enable detection by separate photodiodes.

WDM technology enables the collective amplification of the various the channels in gain fiber, such as erbium-doped fiber and/or regular fiber, in a Raman amplification scheme.

Other WDM applications include the dynamic routing of channels in optical WDM networks with multiple network access nodes.

In commercially available and proposed WDM systems, the channel assignments/spacings can be tight, 100 Giga-Hertz (GHz) to 50 GHz, based on the ITU grid. Further, the number of potential channels on a link can be large. Observation of the ITU Grid suggests 100's of channels in the $L_\alpha$, $C_\alpha$ and $S_\alpha$, bands, even if the 50 GHz offset of the $L_\beta$, $C_\beta$, and $S_\beta$ band is ignored. Still other systems are being proposed that have assignments/spacings in the 10 to 25 GHz range. Thus, each channel must be confined to its channel slot frequency assignment to an absolute accuracy of less than 10 GHz, in some cases.

In order to verify the proper operation of these WDM systems, optical channel monitors are required. These devices typically have a tunable band pass filter that is scanned across the signal band to detect the individual channels. It can thus verify that channels have proper wavelength positions and that proper guard bands are being maintained between adjacent channels. They can also be used to verify that the channel powers are consistent with each other such that one channel is not broadcasting with a power that is overwhelming adjacent channels.

In some applications, it is further desirable to have the ability to resolve the absolute wavelengths of the channels. This typically requires some sort of wavelength reference signal.

Although some systems use capacitive sensing to infer the center wavelength position of the tunable filter passband, other typically more accurate systems rely on optical reference signals.

The filter is scanned across a reference signal with a known and highly stable spectral feature, such as a frequency locked line of a distributed Bragg reflector laser. This is used to calibrate the tunable laser for a subsequent scan across the signal band of the WDM signal. From this information, the channel monitoring system either extrapolates or interpolates the absolute frequency scale in the WDM signal from the spectral feature in the reference signal.

SUMMARY OF THE INVENTION

The present invention is directed to a tunable filter system, which is preferably used as an optical channel monitor in a WDM system, although it has applicability in any tunable filter application requiring a wavelength reference.

The invention relies on a characteristic of a class of tunable filters, such as Fabry Perot etalons, in which light that is not transmitted through the filter is reflected. Thus, while the tunable filter appears as a band pass filter in transmission, it functions as a notch filter, in reflection. Preferably, a reflection detector is provided that detects spectral features of a reference signal that are reflected by or otherwise returned from the tunable filter.

In general, according to one aspect, the invention features a tunable filter system that comprises a signal source providing a WDM having multiple channels, or other signal requiring spectral analysis, within a spectral signal band. A reference signal source is also provided that generates a reference signal with spectral features, such as narrow spectral lines, that are located within a spectral reference band. A tunable filter functions as a band pass filter in transmission and a notch filter in reflection. It is controlled to filter both the reference signal and the WDM signal. A transmission detector is provided to detect the signal transmission through the tunable filter and a return detector is provided to detect the signal that is returned from the tunable filter.

In the preferred embodiment, the spectral reference band is located outside and separate from the signal band. The bands are separated from each other, relative to the tunable filter's free spectral range such that one order of operation of the tunable filter scans the signal band while another order of operation scans the reference band. In the preferred embodiment, the tunable filter is a Fabry-Perot tunable filter or similar device that has an optical resonant cavity bounded by at least two reflectors. At least one of these reflectors is a deflectable membrane to thereby provide for the tunable spectral passband/notch.

In the preferred embodiment, the controller monitors the transmission detector to detect the multiple channels within the signal band and monitors the reflection detector to detect the reference features in the reference band. The position of these reference features is preferably known on an absolute basis. The controller uses the information from the reflection detector to determine the passband's absolute wavelength within the signal band. Typically, fixed bandpass or low/high pass filters are provided between the tunable filter and the transmission detector and between the tunable detector and the reflection detector. This ensures that the transmission detector, for example, only sees the signal band and the reflection detector, for example, only sees the reference band.

In the present implementation, the reference source is comprised of a broadband source such as a luminescent light emitting diode. A fixed wavelength etalon is then provided in combination with a band pass filter that defines the reference band.

In general, according to another aspect, the invention also features a WDM signal analysis method. This comprises receiving a WDM signal having multiple channels within a spectral signal band while generating a reference signal having spectral reference features located in a spectral reference band. The WDM signal and the reference signal are launched at a tunable filter. A passband of the tunable filter is scanned across the signal band. Multiple channels within the signal band are detected by reference to transmission through the tunable filter, while an absolute wavelength of the multiple channels is determined by reference to spectral features in the reference band that is detected in reflection from the tunable filter.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
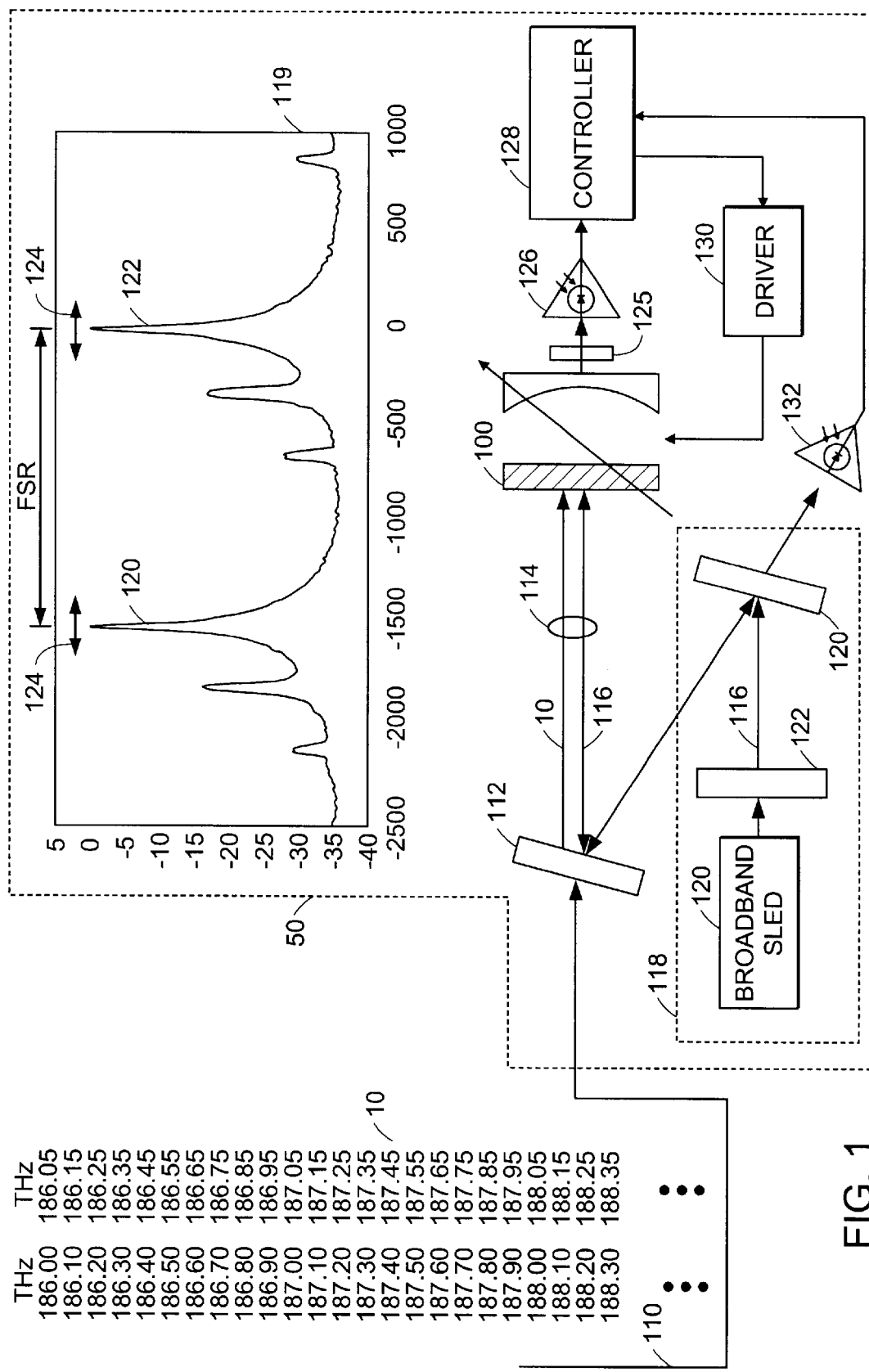
FIG. 1 is schematic view of a tunable filter system using backreflection reference, according to the present invention.

FIG. 1 shows a tunable filter system 50 using backreflection, which has been constructed according to the principles of the present invention.

Specifically, a WDM signal 10 is provided to the tunable filter 100, typically via an input optical fiber 110. Within the tunable filter system 50, the WDM signal 110 passes through a WDM filter 112. Specifically, this WDM filter, in the illustrated embodiment, is transmissive to light within the signal band, but reflective to light within the reference band. As a result, the WDM signal 10 is transmitted through the WDM filter 112 to the tunable filter 100. The beam 114 that is launched into the tunable filter 100 also preferably comprises the reference signal 116 that is reflected by filter 112.

In one implementation, the reference signal 116 is generated by a reference signal generator 118 that is integrated on the same optical bench as the tunable filter 100. In the illustrated example, this reference signal generator 118 comprises a broadband super luminescent light emitting diode (SLED) 120. This generates a broad spectrum signal that extends at least over the entire reference band. This signal is then filtered by a fixed Fabry Perot etalon/filter 122. It converts the broadband signal from the SLED 120 into the reference signal 116, having stable, spectrally narrow peaks. The reference signal is then reflected by a beam splitter 120 to the WDM filter 112, which reflects the reference signal 116 in the direction of the tunable filter 100.

The tunable filter 100 applies a transmission spectral filtering function as illustrated by the inset 118, as is typical of Fabry Perot filters, and related filters that comprise one or more resonant cavities. The filter function 118 comprises multiple spectrally discrete peaks 120, 122 that are separated by a spectral distance corresponding to the free spectral range (FSR) of the tunable filter. Filter membrane deflection or other tuning moves these peaks 120, 122 spectrally as indicated by arrows 124.

In the instant implementation, the transmission through the tunable filter 100 is detected by a transmission detector 126. Controller 128 monitors the electrical signal from the transmission detector 126 to thereby analyze the spectral content of the WDM signal 110. The controller 128 further comprises a filter driver 130 that drives the deflectable membrane of the tunable filter 100.

A WDM or low pass filter 125 is provided between the tunable filter 100 and the transmission detector 126 to insulate the transmission detector 126 from the reference signal 116.

In order to have an absolute wavelength reference, the signal reflection from the tunable filter 100 is also monitored, by a reflection detector 132. The reflected signal from the tunable filter 100 that is within the reference band is reflected by WDM filter 112 and part of the signal is then transmitted through the beam splitter 120 to the reflection detector 132. The electrical signal from the reflection detector 132 is also monitored by the controller 128.

Figure 2:
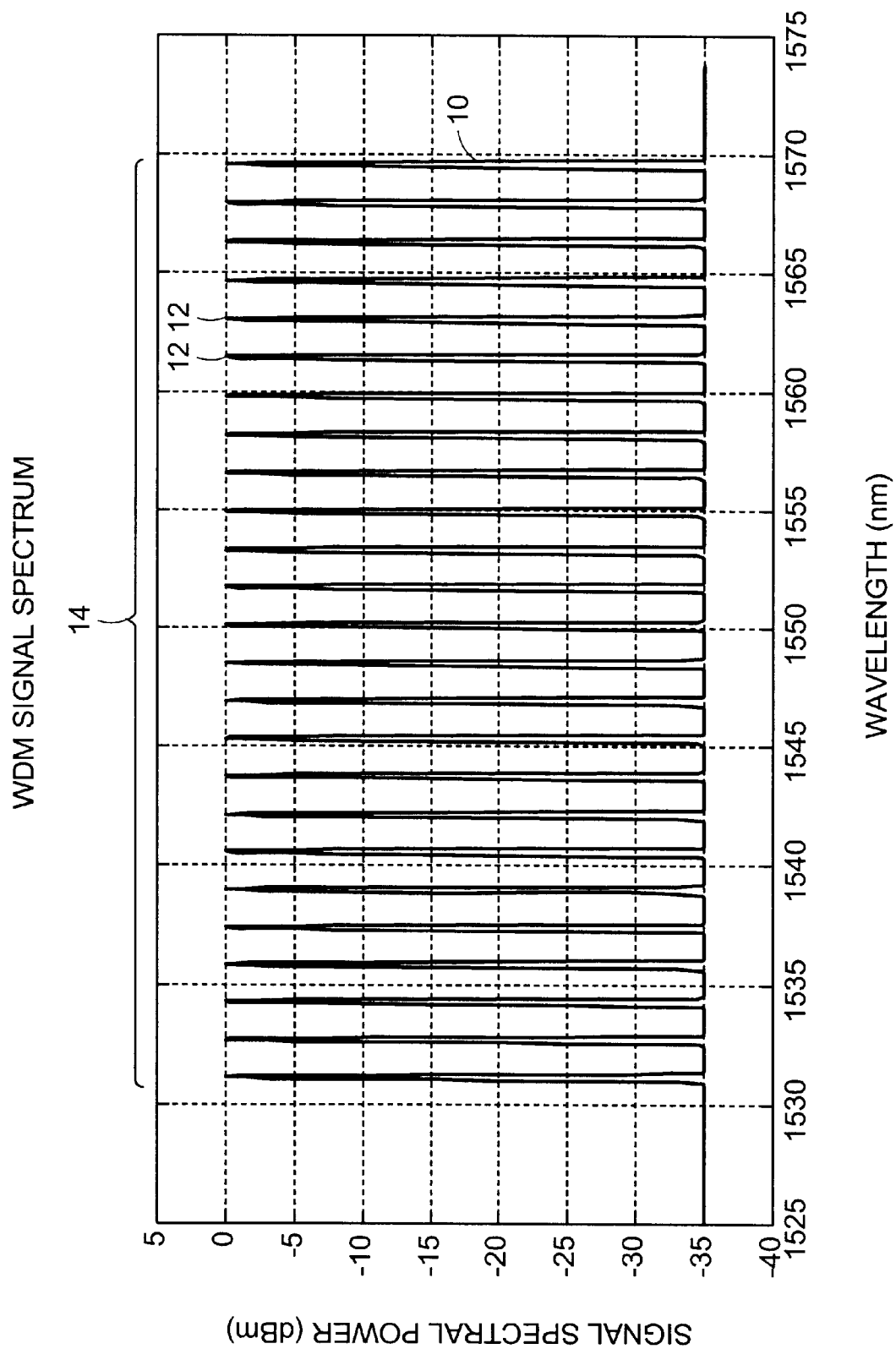
FIG. 2 is a spectral plot of a WDM signal showing the spectrally discrete channels within a signal band.

FIG. 2 is a plot of power as a function of wavelength for an exemplary WDM signal 10. Multiple channel signals 12 are evenly distributed across a signal band 14.

Figure 3:
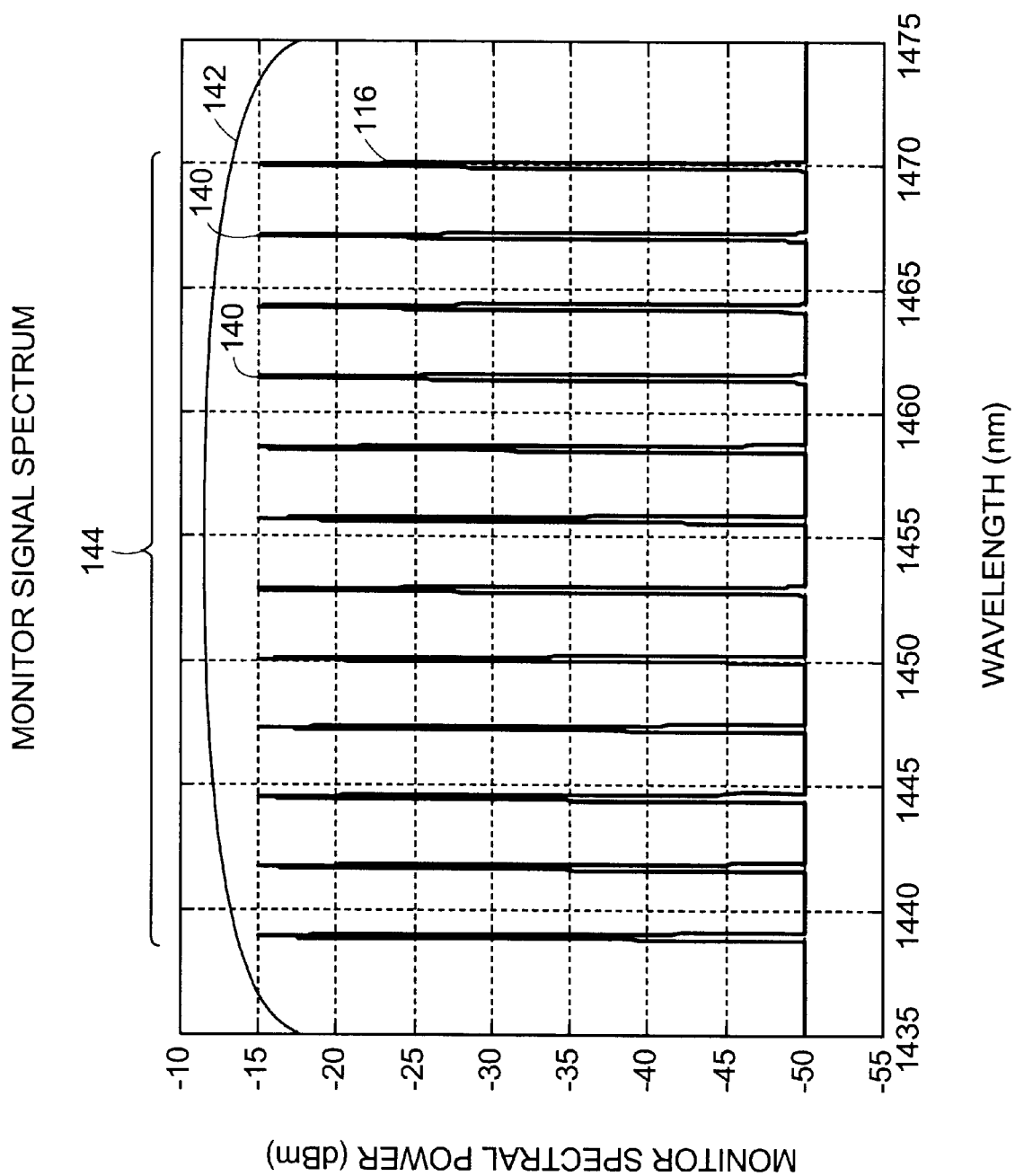
FIG. 3 is a spectral plot of an exemplary reference signal showing the spectral reference features located in a reference band.

FIG. 3 shows an exemplary reference signal 116. Preferably, the extent of these spectral features 140 is limited to a reference band 144 that is distinct from the signal band 14.

Note that the specific wavelengths in the FIGS. 2 and 3 plot are only given by way of illustration. In fact, in some WDM schemes, the illustrated reference band 144 lies within the signal band, although, in the current ITU grid, the signal band extends only to approximately 1490 nm.

Figure 4:
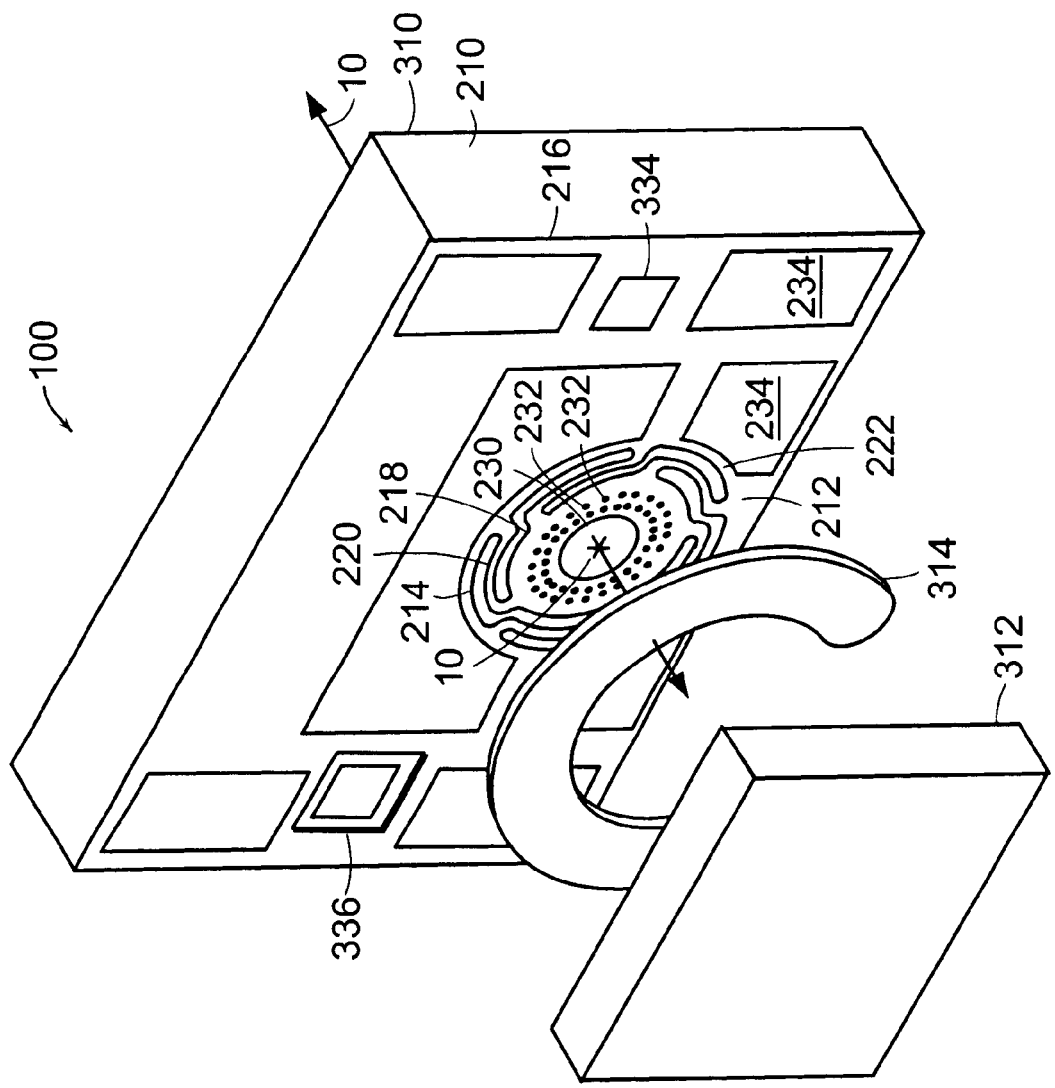
FIG. 4 is a perspective, exploded view of an exemplary Fabry-Perot tunable filter.

FIG. 4 shows an exemplary micro-optical electromechanical system (MOEMS) tunable Fabry-Perot filter 100 that is used in current implementations.

Generally, in the filter 100, a spacer device 314 separates a fixed mirror structure 312 from the membrane device 310.

The optical membrane device 310 comprises handle material 210. An optical membrane or device layer 212 is added to the handle wafer material 210. The membrane structure 214 is formed in this optical membrane layer 212.

An insulating layer 216 separates the optical membrane layer 212 from the handle wafer material 210. During manufacture, this insulating layer functions as a sacrificial/release layer, which is partially removed to release the membrane structure 214 from the handle wafer material 210.

In the current embodiment, the membrane structure 214 comprises a body portion 218. The optical axis of combined optical signal 10 of the device 100 passes concentrically through this body portion 218 and orthogonal to a plane defined by the membrane layer 212. Tethers 220 extend radially from the body portion 218 to an outer portion 222, which comprises the ring where the tethers 220 terminate. In the current embodiment, a spiral tether pattern is used.

An optical coating, highly reflecting (HR) dielectric mirror stack 230 is typically deposited on the body portion 218 of the membrane structure 214. In combination with an HR coating on fixed mirror structure 312, a Fabry-Perot resonator cavity is defined. Preferably, either the fixed mirror 312 or the membrane mirror 230 is curved.

In the illustrated embodiment, artifacts of the manufacture of the membrane structure 214 are etchant holes 232. These holes allow an etchant to pass through the body portion 218 of the membrane structure 214 to assist in the removal of the insulating layer 216 during the release process.

In the illustrated embodiment, metal pads 234 are deposited on the proximal side of the membrane device 210. These are used to solder bond, for example, the spacing structure 214 onto the proximal face of the membrane device 210. Of course, it could be avoided if the spacing structure 214 is formed to be integral with the membrane device 310. Bond pads 234 are also useful when installing the filter 100 on a micro-optical bench, for example.

Also provided are a membrane layer wire bond pad 334 and a handle wafer wire bond pad 336. The membrane layer bond pad is a wire bonding location for electrical control of the membrane layer. The handle wafer bond pad 336 is a wire bond pad for electrical access to the handle wafer material. This electrical control results in an electrostatic cavity being generated across the insulating layer 216 such the generated electrical fields result in the controlled out-of-plane deflection of the membrane body 218.

Figure 5:
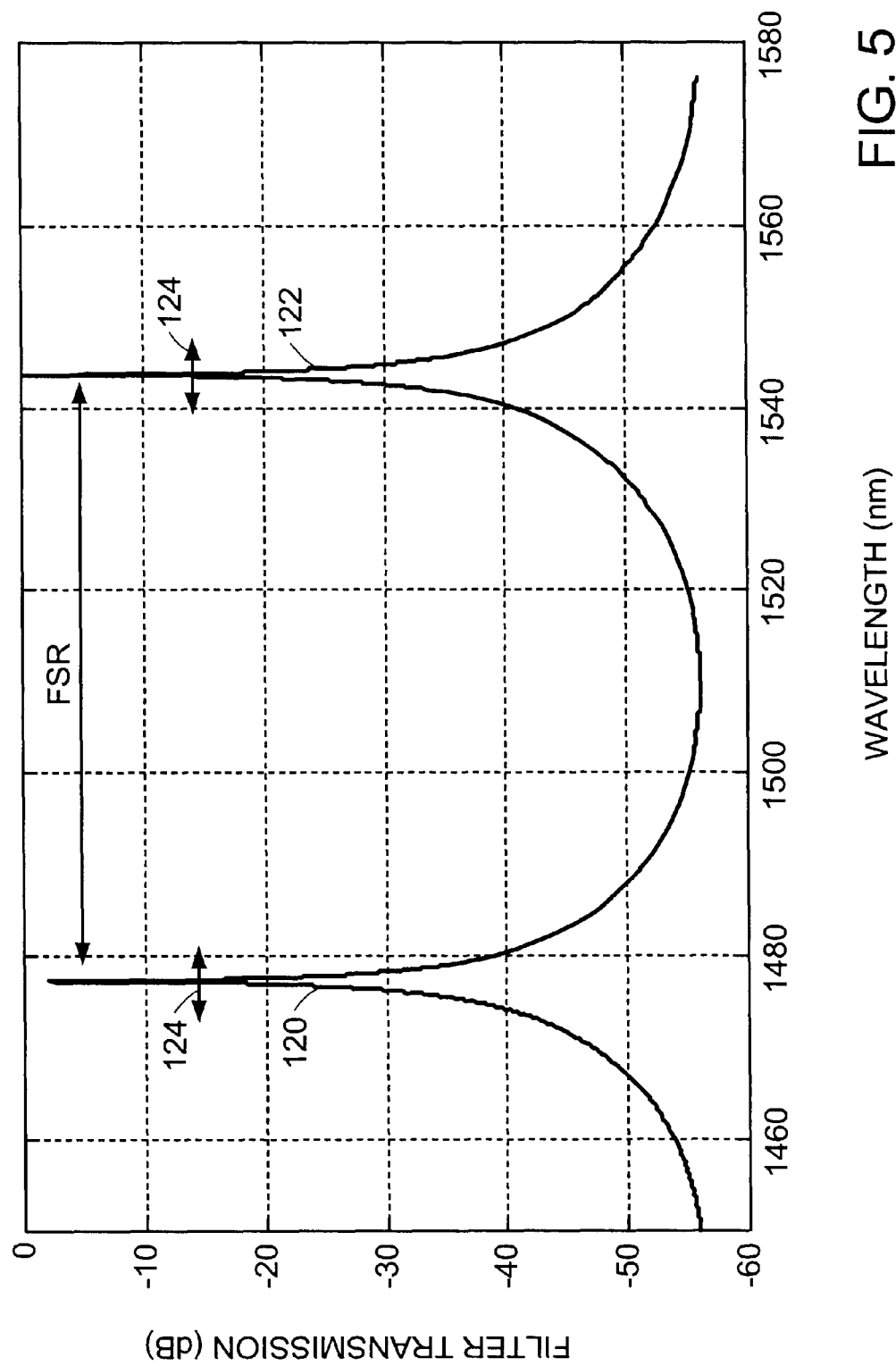
FIG. 5 is a spectral plot of signal transmission as a function of wavelength for the tunable filter under static conditions.

FIG. 5 is a plot of filter transmission as a function of wavelength for a filter as illustrated in FIG. 4. It illustrates the two filter pass bands 120, 122 that are separated by the free spectral range. These peaks 120, 122 are tuned in synchronism as illustrated by arrows 124 in response to the movement of the optical membrane 110 as discussed in reference to FIG. 4.

Figure 6:
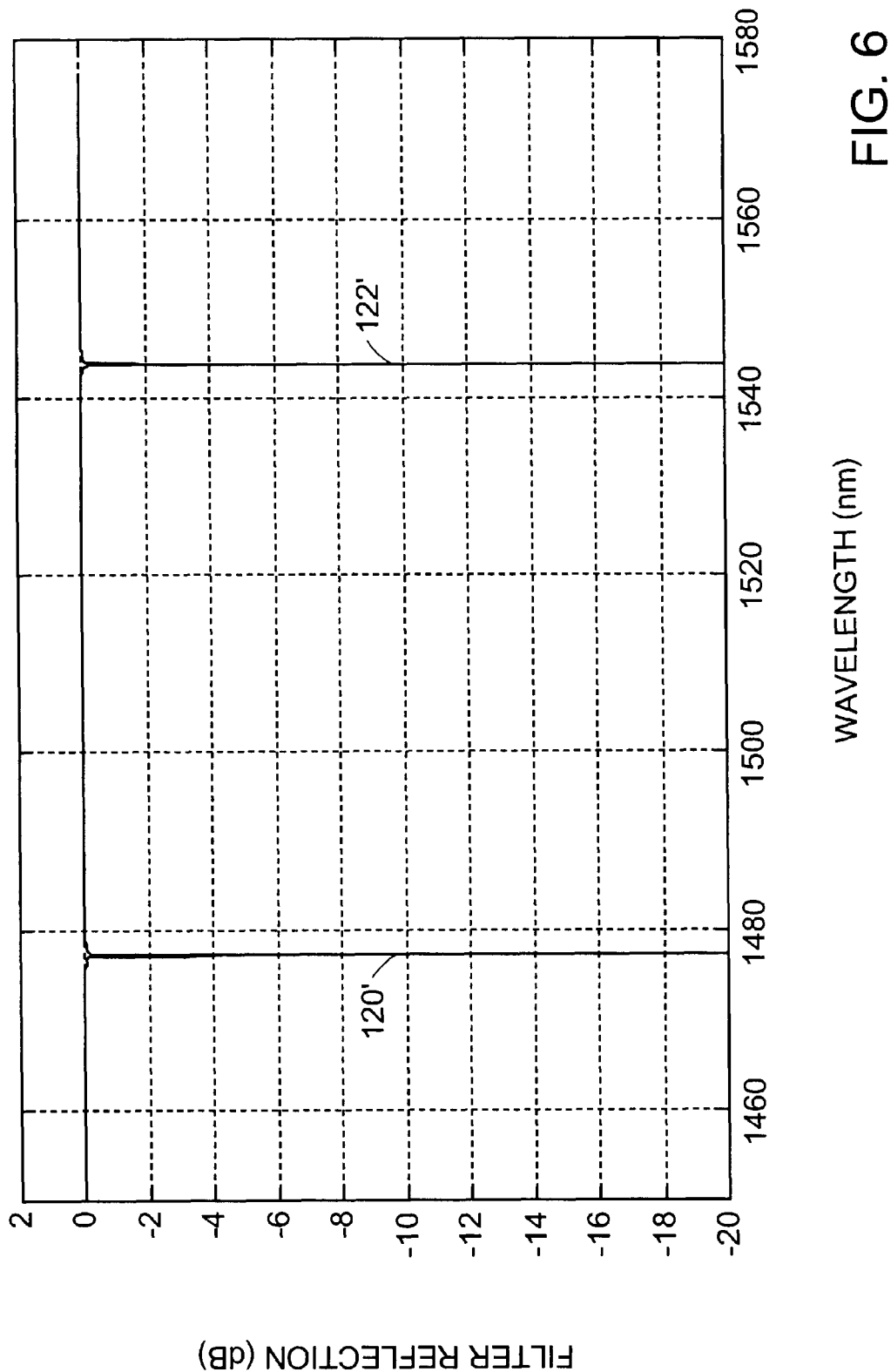
FIG. 6 is a spectral plot of signal reflection as a function of wavelength for the tunable filter under static conditions.
Figure 7:
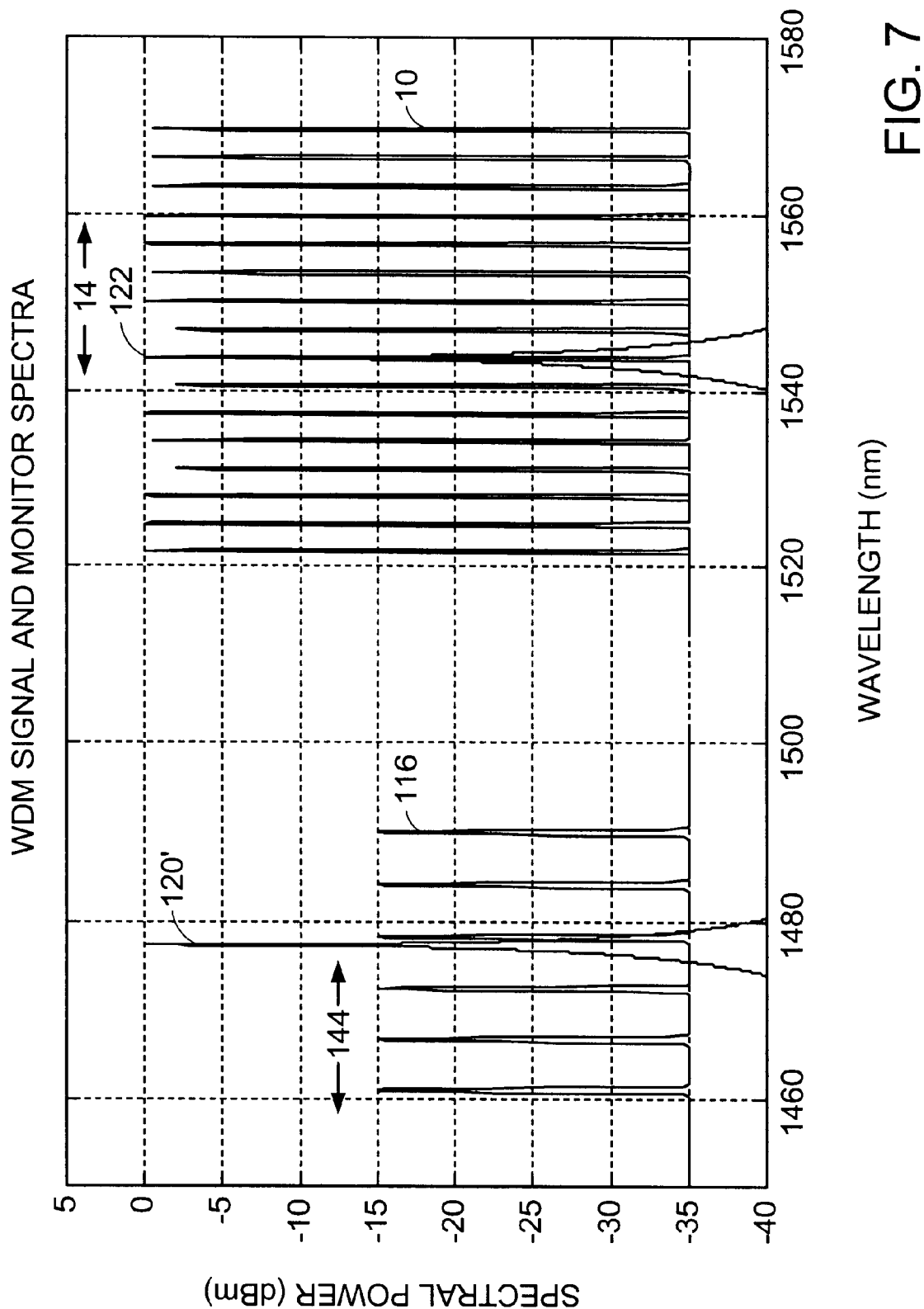
FIG. 7 is a spectral plot showing the signal and reference bands relative to a mode of the tunable filter under static conditions.

FIG. 6 is a plot of filter reflectance as a function of wavelength. Specifically, notches 120', 122', associated with the pass band peaks 120, 122 occur in reflectance. Thus, as illustrated in FIG. 7, when the Fabry Perot filter tuning characteristic is laid over the reference signal 116 and the WD signal 10, the filters modes 120, 122 are tuned across the reference band of the reference signal 116 and the signal band associated with the WDM signal.

Note, however, in operation, in the preferred embodiment, the notch 120' of the Fabry Perot filter 100 is typically associated with the reference band 144. Specifically, the controller 128 monitors the response of the reflection detector 132 for drops in the signal response associated with the notch 120' of the tunable filter passing over one of the spectral features of the reference signal 116. Since these spectral features are at known locations because of the Fabry Perot etalon 122, the controller uses this information to determine the absolute location of the tunable filter's pass band 122 within the signal band 14 since the FSR is known and stable.

Figure 8:
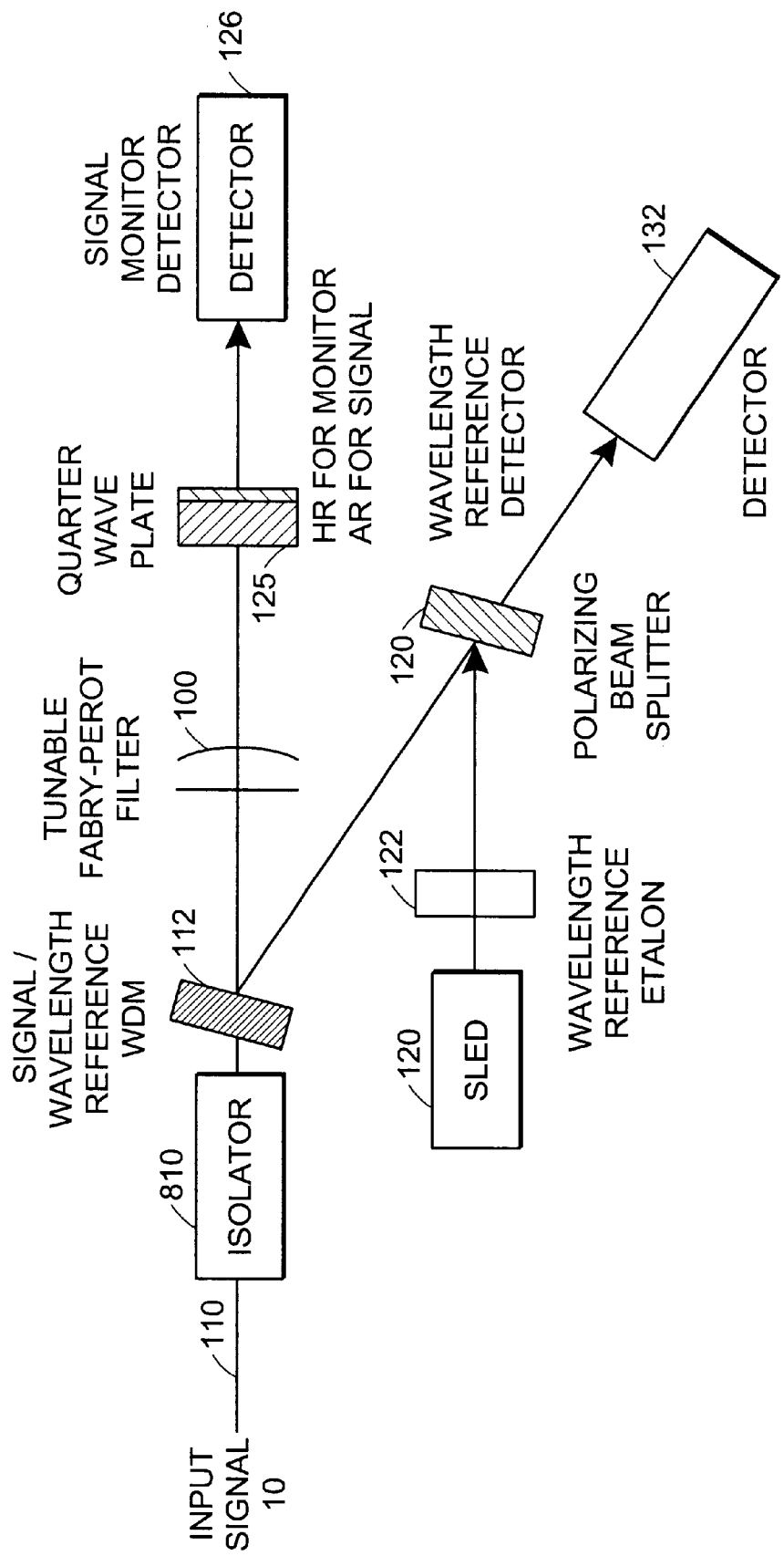
FIG. 8 is schematic view of a tunable filter system using return reference, according to a second embodiment of the present invention.

FIG. 8 shows another implementation in which an isolator 810 is added up stream of the WDM filter 112. This insulates any upstream devices from interference from the reference signal or back reflection or return from the Fabry Perot filter 100. This embodiment also shows an implementation of the filter 125 as a quarter wave plate that is further highly reflecting for the reference band 144 but antireflecting or transmissive for the signal band 14. This quarter waveplate 125 functions to reflect and rotate the polarization of the reference signal 116. Thus, the detector 132 functions as a return detector that is responsive to the double-pass transmission of the reference signal through the filter 100. This embodiment, therefore, yields a substantially more accurate reference system due to this double pass configuration, which results is a narrower effective passband of filter 100.

Figure 9:
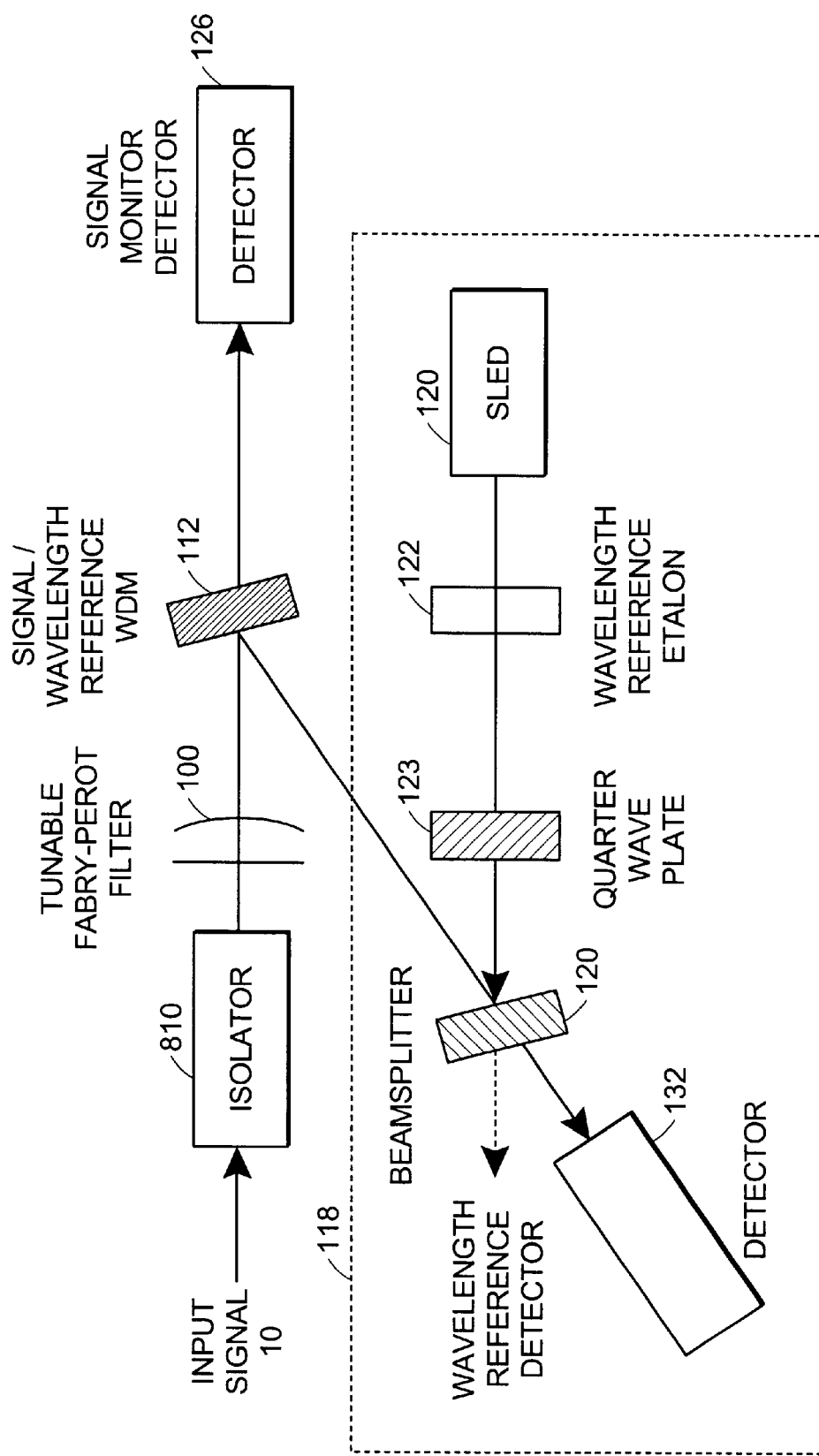
FIG. 9 is schematic view of a tunable filter system using backreflection reference, according a third embodiment of the present invention.

FIG. 9 shows a third embodiment of the tunable filter system where the reference signal system 118 is located on the downstream side of the tunable filter 100. A quarter wave plate 123 is added to provide isolation. The WDM filter 112 in this implementation also is moved to the downstream side of the Fabry Perot tunable filter 100.

Figure 10:
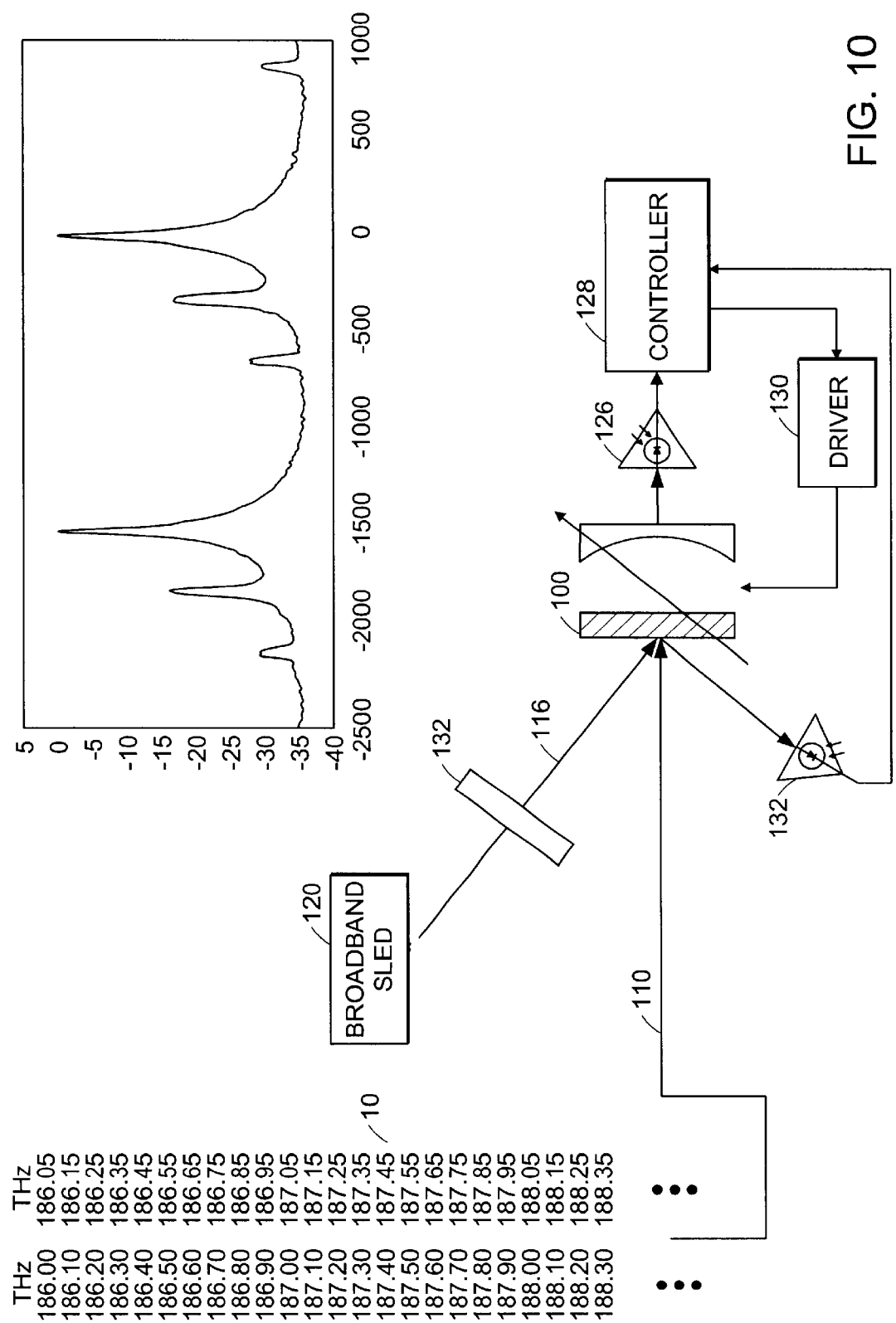
FIG. 10 is schematic view of a tunable filter system using backreflection reference, according to a fourth embodiment of the present invention.

FIG. 10 is a third embodiment of the tunable filter system. This embodiment simplifies filter train alignment issues since a combined beam of the reference signal and the WDM signal is not required. Instead, the reference signal 116 strikes the tunable filter 100 at an oblique angle and then is detected by the reflection detector 132.

While this invention has been particularly shown and described with references to preferred embodiments thereof, it will be understood by those skilled in the art that various changes in form and details may be made therein without departing from the scope of the invention encompassed by the appended claims.

What is claimed is:

1. A tunable filter system comprising:
    a signal source providing a WDM signal having multiple channels within a spectral signal band;
    a reference source that generates a reference signal with spectral reference features located in a spectral reference band;
    a tunable filter that functions a bandpass filter in transmission and a notch filter in reflection, the tunable filter filtering the reference signal and the WDM signal;
    a transmission detector for detecting a signal that is transmitted through the tunable filter; and
    a return detector that detects a signal that is returned from the tunable filter.

2. A tunable filter system as claimed in claim 1, wherein the spectral reference band that is outside of the signal band.

3. A tunable filter system as claimed in claim 1, wherein the tunable filter is a tunable Fabry-Perot filter.

4. A tunable filter system as claimed in claim 1, wherein the tunable filter comprises a cavity bounded by at least two reflectors, at least one of which is on a deflectable membrane to create a tunable spectral passband.

5. A tunable filter system as claimed in claim 1, wherein the filter has a free spectral range that is less than a combined bandwidth of the signal band and reference band.

6. A tunable filter system as claimed in claim 1, further comprising a filter controller that tunes one mode of the tunable filter across the reference band and another mode of the tunable filter across the signal band.

7. A tunable filter system as claimed in claim 1, wherein the controller monitors the transmission detector to detect the multiple channels within the signal band and monitors the return detector to detect the reference features in the reference band.

8. A tunable filter system as claimed in claim 1, further comprising a signal band bandpass filter between the tunable filter and the transmission detector to block transmission of the reference band to the transmission detector.

9. A tunable filter system as claimed in claim 1, further comprising a reference band bandpass filter between the tunable filter and the return detector to block transmission of the signal band to the return detector.

10. A tunable filter system as claimed in claim 9, further comprising a signal band bandpass filter between the tunable filter and the transmission detector to block transmission of the reference band to the transmission detector.

11. A tunable filter system as claimed in claim 1, wherein the reference source comprises:
   a broadband source; and
   a fixed wavelength etalon that generates the reference features from the emission from the broadband source.

12. A tunable filter system as claimed in claim 11, wherein the reference source further comprises a fixed filter having a passband corresponding to the reference band for filtering the output of the etalon.

13. A tunable filter system as claimed in claim 1, further comprising a beam combiner that generates a combined beam, from the reference signal and the WDM signal, which combined beam is launched at the filter.

14. A tunable filter system as claimed in claim 1, further comprising a filter reflector that reflects the reference signal to travel back through the tunable filter to be detected by the return detector.

15. A tunable filter system as claimed in claim 1, wherein the reference signal and the WDM signal are counter propagating through the tunable filter and are launched from different sides of the tunable filter.

16. A WDM signal analysis method comprising:
   receiving a WDM signal having multiple channels within a spectral signal band;
   generating a reference signal, having spectral reference features located in a spectral reference band;
   launching the WDM signal with the reference signal at a tunable filter;
   tuning a passband of the tunable filter across the signal band;
   detecting the multiple channels within the signal band by reference to a transmission though the tunable filter; and
   determining an absolute wavelength of the multiple channels within the signal band in response to the reference features in the reference band that are detected from reflection from the tunable filter.

* * * * *